United States Patent
Begin, Jr. et al.

(10) Patent No.: US 9,430,792 B2
(45) Date of Patent: Aug. 30, 2016

(54) USING CROSS-DOMAIN COMMUNICATION TO SERVE CLOUD-BASED PRODUCT CATALOG PAGES FROM A SELLER'S DOMAIN

(71) Applicant: Catalog Data Solutions, Inc., San Jose, CA (US)

(72) Inventors: David Henry Begin, Jr., San Jose, CA (US); Aaron Martin Smith, San Jose, CA (US); John Cameron Major, San Jose, CA (US); Richard Duane Bjorn, San Jose, CA (US)

(73) Assignee: Catalog Data Solutions, Inc., San Jose, CA (US)

( * ) Notice: Subject to any disclaimer, the term of this patent is extended or adjusted under 35 U.S.C. 154(b) by 533 days.

(21) Appl. No.: 13/838,369

(22) Filed: Mar. 15, 2013

(65) Prior Publication Data
US 2013/0275272 A1 Oct. 17, 2013

Related U.S. Application Data

(60) Provisional application No. 61/623,227, filed on Apr. 12, 2012.

(51) Int. Cl.
*G06Q 30/00* (2012.01)
*G06Q 30/06* (2012.01)

(52) U.S. Cl.
CPC .................. *G06Q 30/0623* (2013.01)

(58) Field of Classification Search
CPC ........................................... G06Q 30/06–30/08
USPC ................................................ 705/26.1–27.2
See application file for complete search history.

(56) References Cited

U.S. PATENT DOCUMENTS

| 7,975,019 | B1 * | 7/2011 | Green | G06Q 30/0241 705/14.4 |
| 2010/0125623 | A1 * | 5/2010 | Rice | H04L 67/2814 709/202 |

* cited by examiner

*Primary Examiner* — Ethan D Civan
(74) *Attorney, Agent, or Firm* — Kilpatrick Townsend & Stockton LLP

(57) ABSTRACT

Methods, systems, computer-readable media, and apparatuses are presented for using cross-domain communication to allow manufacturers and other sellers to use cloud/Internet-based products catalog services without sacrificing the search-engine optimization benefit of catalog pages hosted within the manufacturer's domain. The Same Origin Policy used by many browsers may disallow direct communication to the manufacturer's domain for corporate web site and other functions, on the one hand, and an external domain for an efficiently hosted products catalog, on the other. Some embodiments present the use of the JSONP protocol for cross-domain retrieval of a Catalog Widget that is configured to retrieve product catalog information directly from the external domain. In these embodiments, search-engine optimization is furthered by the efficient production of numerous catalog pages that originate from the external domain yet appear to users and search engine crawlers to be within the manufacturer's domain.

19 Claims, 4 Drawing Sheets

USING CROSS-DOMAIN COMMUNICATION TO SERVE CLOUD-BASED PRODUCT CATALOG PAGES FROM A SELLER'S DOMAIN

CLAIM OF PRIORITY

The present patent application claims priority under 35 U.S.C. §119 to U.S. Provisional Patent Application Ser. No. 61/623,227; filed Apr. 12, 2012; titled "USING CROSS-DOMAIN COMMUNICATION TO SERVE CLOUD-BASED PRODUCT CATALOG PAGES FROM A SELLER'S DOMAIN." The contents of U.S. Provisional Patent Application Ser. No. 61/623,227 are incorporated by reference herein.

BACKGROUND

Almost since the Internet has come into being, businesses have been using it in an attempt to sell their merchandise. Using search engines, people (potential buyers) can enter queries that will cause those search engines to return, to those people, references to web pages that are relevant to those queries. The references returned typically will be ranked based upon some ranking algorithm used by the search engine. Such an algorithm can involve some measure of relevance (e.g., how many words of the query occurred within a web page, and/or a quantity of times that each such word occurred within the web page), but it may also involve a measure of a quantity of web pages that are known to be associated with a particular Internet domain. As used herein, an Internet domain comprises the last two parts (separated by a period) of a domain name in a Uniform Resource Identifier (URL), which comes before any single "/" characters in the URL. For example, in the URL "www.catalogdatasolutions.com," the top-level domain is ".com" and the Internet domain is "catalogdatasolutions.com." Many different web pages may be served by a web server that is owned and operated by the particular business to which this Internet domain is registered. Each of these web pages may have URLs that differ, but which are prefaced by the same identifier of this Internet domain. A subdomain of a web page also can be relevant. For example, "catalog.acme.com" is in a different subdomain than "www.acme.com." The subdomain typically precedes the Internet domain in the URL. Some very well-known and popular search engines give great weighting, in their ranking algorithms, to the quantity of web pages that have URLs that are prefaced by the same Internet domain identifier and that are in the same subdomain. Thus, such search engines may place, most foremost in their list of search results, references to web pages having Internet domains and subdomains that are associated with the highest quantities of web pages (and which are to some extent still relevant to the query). Unfortunately, this can mean that smaller websites have a slimmer chance of having their web pages discovered by search engine users, and the businesses that own and operate those websites may have a correspondingly slimmer chance of selling their products to those search engine users.

BRIEF SUMMARY

Certain embodiments are described that involve using cross-domain communication to serve cloud-based product catalog pages from a seller's/supplier's domain. In one or more embodiments, the seller/supplier may be a manufacturer, such as a product manufacturer. A typical seller/supplier contracts with a catalog provider to implement and run an online catalog on the supplier's website. If the catalog provider is a running a SaaS or cloud implementation, then the online catalog is not running on the seller/supplier's website, and the seller's/suppliers main URL (e.g., www.supplier.com) is therefore not used when displaying the catalog pages. A typical implementation will use a CNAME DNS, or alias record, to display the catalog pages on the seller's/supplier's website. The website "www.supplier.com" will typically use "www.catalog.supplier.com" to display catalog pages on their website. Because of this, the seller/supplier does not receive "credit" for the pages as the search engines know that DNS is an alias, and the catalog pages resides on a separate site. As discussed in greater detail below, the rank of a manufacturer's/seller's/supplier's website page in a web search engine's search results is, in many situations, directly proportional to the number of web pages hosted on the manufacturer's website's domain and/or subdomain (e.g., the total number of web pages making up the website)—the greater the number of pages, the higher the rank. In some instances, a manufacturer's website may serve one or more webpages that include an embedded Product Catalog Widget, which may allow catalog pages that are dynamically generated by a cloud-based catalog provider to be viewed (e.g., in an end user's web browser). Embodiments of the disclosure cause search engine crawlers to see web pages provided by a Product Catalog Widget as being hosted on the manufacturer's website's domain and/or subdomain, rather than on an external domain (e.g., a domain hosting a website of a Partner providing the Product Catalog Widget). This allows a manufacturer to increase the rank of their web pages in search results from various search engines, while still allowing the manufacturer to use a third-party partner to produce and host the pages that make up the Products Catalog. Embodiments of the invention allow a SaaS or a cloud-based catalog provider to provide all the catalog pages on the supplier's/seller's/manufacturer's main domain, (e.g., "www.supplier.com"). This, in turn, provides a higher number of relevant pages on the supplier's/seller's/manufacturer's website and therefore a higher ranking by the search engines.

Certain embodiments of the invention use the "JavaScript Object Notation with padding" (JSONP) protocol. In some embodiments, a request for a product locator catalog page may be received at a server computer hosting a website for a product manufacturer. Subsequently, the server computer may request, via a JSONP catalog service proxy, the product locator catalog page from one or more cloud catalog servers. The server computer then may receive, via the JSONP catalog service proxy, the product locator catalog page, and the product locator catalog page may include an embedded catalog widget. Subsequently, the server computer may serve the product locator catalog page.

In some embodiments, the embedded catalog widget may be configured to allow a user device receiving the product locator catalog page to search a products catalog hosted on the one or more cloud catalog servers.

In some embodiments, the server computer further may receive a request for a product detail page. Subsequently, the server computer may request, via the JSONP catalog service proxy, the product detail page from the one or more cloud catalog servers. The server computer then may receive, via the JSONP catalog service proxy, the product detail page from the one or more cloud catalog servers. Subsequently, the server computer may serve the product detail page.

In some embodiments, the product detail page may be dynamically generated by the one or more cloud catalog servers based on the request received from the server computer.

DETAILED DESCRIPTION

In the following description, for the purposes of explanation, specific details are set forth in order to provide a thorough understanding of embodiments of the invention. However, it will be apparent that various embodiments may be practiced without these specific details.

Manufacturer IT Landscape Summary

Figure 1:
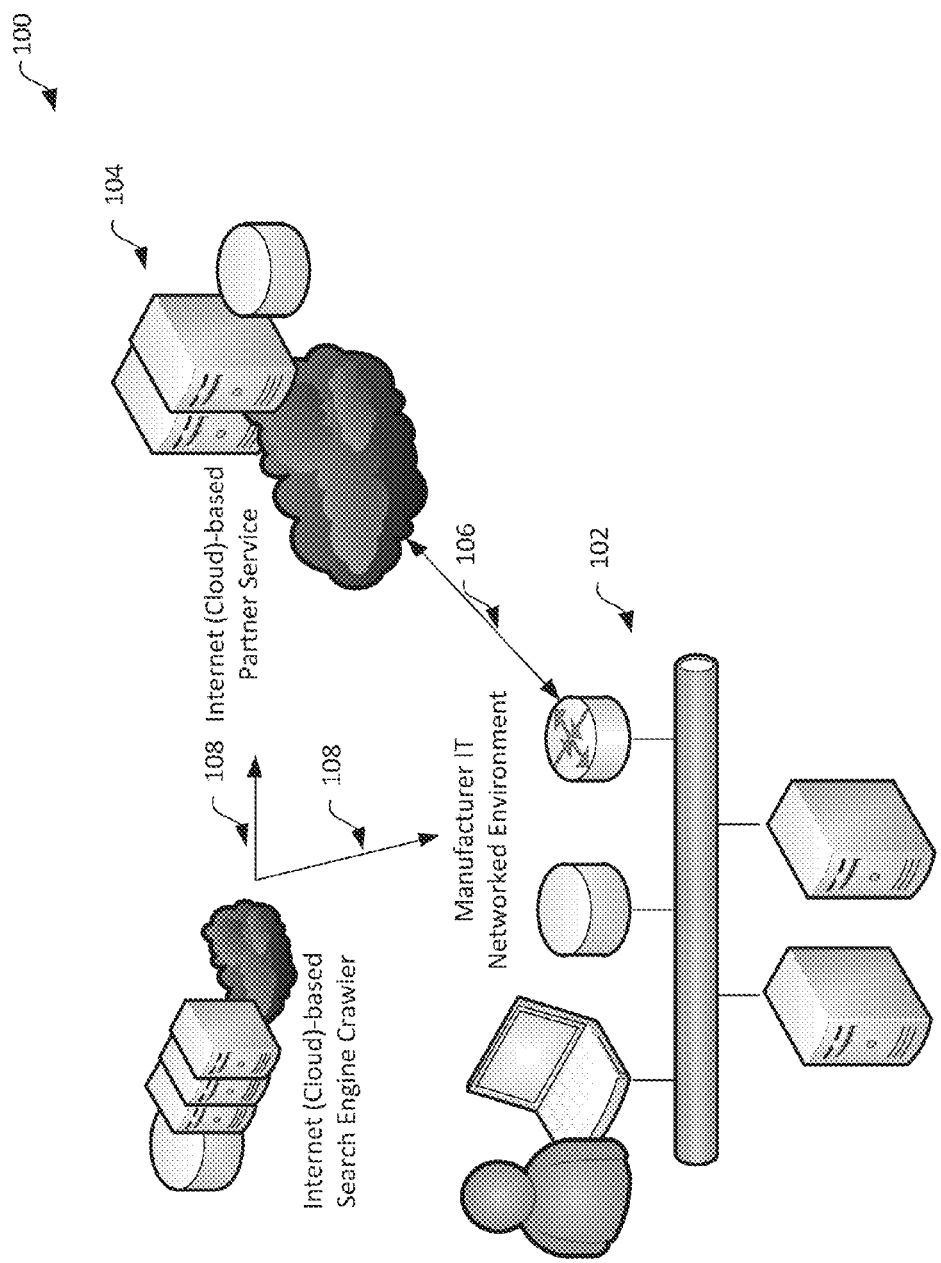
FIG. 1 illustrates an example of a typical manufacturer's networked IT infrastructure linked to an external Web Service, such as a cloud Web Service.

Certain embodiments of the present invention relate to using cross-domain communication to serve cloud-based product catalog pages from a seller's domain. As noted above, in some instances, a seller or manufacturer may serve one or more webpages that include an embedded Product Catalog Widget, which may allow catalog pages that are dynamically generated by a cloud-based catalog provider to be viewed (e.g., in an end user's web browser). Such a Product Catalog Widget thus can manage querying and retrieval of products information from a cloud-based Products Catalog. Before describing these aspects in greater detail, an example of a typical Manufacturer's IT Landscape will be summarized. FIG. 1 illustrates an example of this landscape.

In FIG. 1, a Manufacturer's Networked IT Environment 102 is shown. The Manufacturer's Networked IT Environment 102 may include Ethernet-connected servers, data stores, client computers, and end users. The Manufacturer can use this environment for a variety of internal uses, such as hosting customer-facing Corporate Web Site pages. There may be advantages in cost and labor efficiency to the Manufacturer having the full control enabled by hosting such content and functions in a proximate location. At the same time, it may be advantageous for the Manufacturer to offer customers, within the context of their web site, complex services that may be most efficiently produced and hosted by Partners externally "in the cloud" 104. These two environments can interact with one another via standard internet communication 106.

Another actor in the landscape is the Search Engine Crawler, a program (e.g., a "bot") that can access publically accessible web pages 108, index them, and assign them priority ranking in results of searches performed by end users. The cross-domain communication techniques described herein allow for all web pages associated with the Manufacturer to be assigned high ranking in Search Engine search results.

In particular, the rank of a manufacturer's website page in a web search engine's search results is, in many situations, directly proportional to the number of web pages hosted on the manufacturer's website's domain (e.g., the total number of web pages making up the website). For example, if a first webpage that includes information about a particular product is hosted on a first domain and a second webpage that includes similar information about the same product is hosted on a second domain that hosts more pages (e.g., other webpages) than the first domain, then the second webpage may be ranked more highly by a search engine in a search for information about the particular product. Because embodiments of the disclosure cause search engine crawlers to see web pages provided by the Product Catalog Widget as being hosted on the manufacturer's website's domain, rather than on an external domain (e.g., a domain hosting a website of the Partner providing the Product Catalog Widget), these embodiments enable a manufacturer to increase the rank of their web pages in search results from various search engines, while still being able to use a third-party partner to produce and host the pages that make up the Products Catalog.

Example of Products Catalog Workflow Using Cross-Domain Communication

This section describes techniques according to some embodiments of the invention by which a Manufacturer may source Product Catalog pages from an externally provided Partner Web Service while allowing those pages to appear to end users and Search Engine Crawlers to be within the Manufacturer's internet domain. In one embodiment, the Products Catalog Widget implements this technique using JSONP cross-domain communication to ensure that both Corporate Web Site pages and externally-hosted Products Catalog pages are indexed within the Manufacturer's domain, thereby optimizing the ranking of those pages within Search Engine search results. Other techniques may be used in alternative embodiments.

Figure 2:
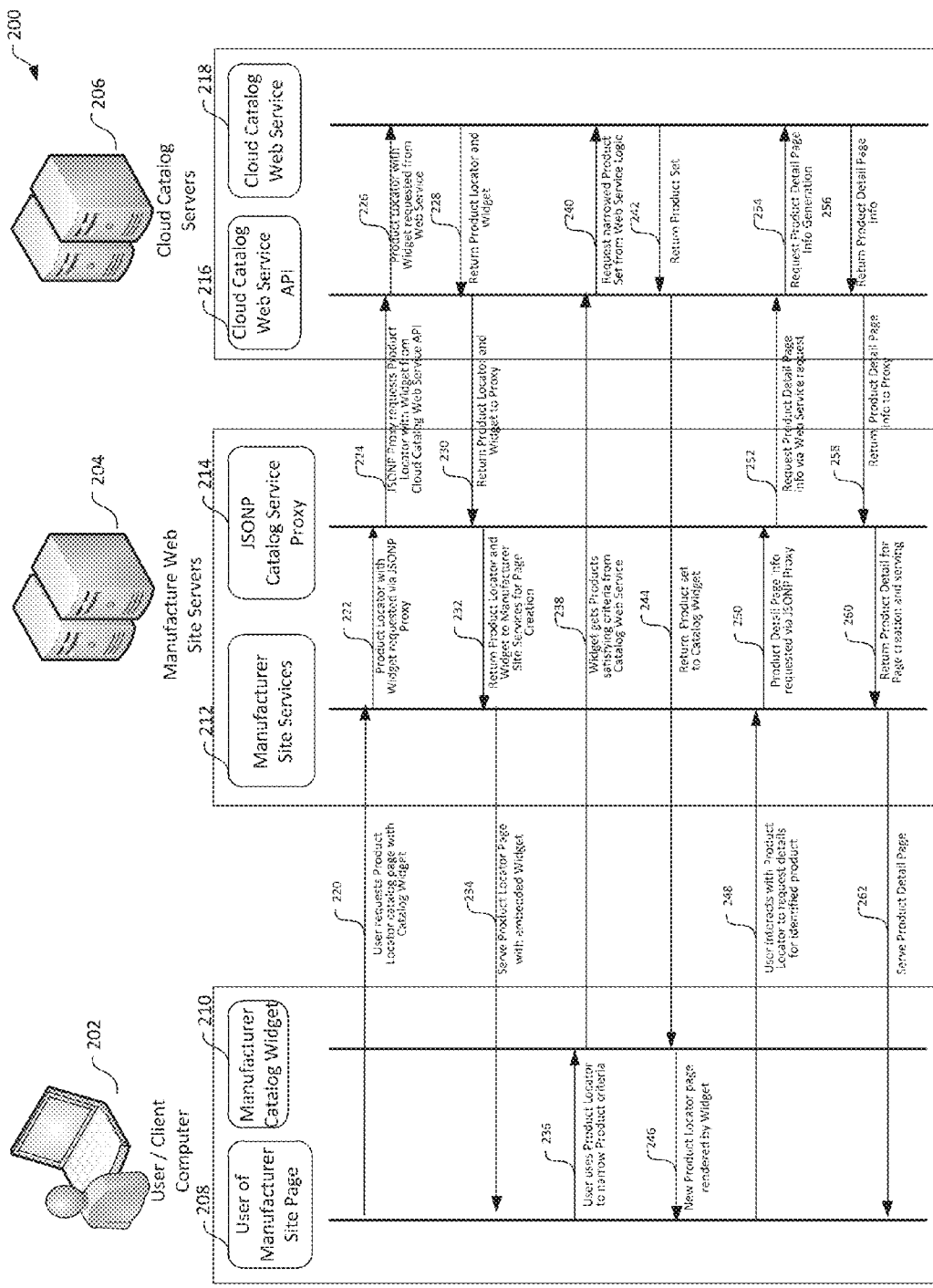
FIG. 2 is a state transition diagram showing how techniques according to some embodiments can be used to retrieve Product Catalog information via JSONP Proxy.

FIG. 2 is a state transition diagram showing how techniques according to some embodiments can be used to retrieve Product Catalog information via JSONP Proxy. As seen in FIG. 2, an End User may use a Client Computer 202. In this scenario, the End User may be a customer or potential customer of the Manufacturer, and may be using the Manufacturer's Corporate Web Site to obtain information about products relevant to his or her project. The Manufacturer's Corporate Web Site may be implemented with Site Services 212 and hosted on Site Servers 204 managed by the Manufacturer. Also on the Site Servers is a Product Catalog Service Proxy 214 that can be used to communicate with Cloud Catalog Servers 206 over the external internet.

When the User 202 is viewing Product categories served in a web page from the Manufacturer's Corporate Web Site 212, he or she may select a category, which indirectly requests 220 that the Cloud Servers 206 return a Product Locator catalog page containing the Product Catalog Widget 210. This Widget may be a set of scripts that enable the Product Locator to be used to search efficiently for products in the catalog, e.g., by specifying product attributes using the Product Locator user interface on the Client Computer 202.

The Product Locator page and the Catalog Widget may be sourced from the external Cloud Catalog Web Servers 206 domain using the JSONP protocol for cross-domain communication. The initial request 220 for a Product Catalog page may be received by the Manufacturer Site Services, which request 222 that the JSONP Catalog Service Proxy 214 make a cross domain request 224 to the Cloud Catalog Web Service application programming interface (API) 216 for the Product Locator information and embedded Catalog Widget, which are then retrieved 226 from the Cloud Catalog Web Services 218. The Product Locator page information and Catalog Widget may be returned 228, 230, to the JSONP Service Proxy, and then 232 to the Manufacturer Web Site Services 212, which may render the Product Catalog Locator page and serve 234 it to the Client Computer 202 web browser for display.

The User 202 may then use the Catalog Widget user interface to specify 236 attribute criteria in order to identify his or her preferred product. The Widget may send 238 these criteria to the Cloud Catalog Web Service API 216, which makes a request 240 to the Cloud Catalog Web Service 218 to get products satisfying criteria specified by the User using the Product Locator. The Cloud Catalog Web Service 218 logic determines the product set conforming to the specified characteristics, and returns 242, 244, a list of the products satisfying these criteria to the Catalog Widget 210, which then renders the updated Product Locator page for display in the Manufacturer Site page 246. This process may be invoked iteratively as often as is needed for the User to identify the product satisfying his or her criteria. In an embodiment of the invention, the criteria can include a part number, a manufacturer identity, a year of manufacture, a part type (screw, bolt, nut, etc.), a current price range for the product or part, whether the product or part is in stock at a local store within a specified distance of a current location of User 202, and/or other criteria.

Once the User has identified a product satisfying his or her criteria, he or she may request that a Catalog Product Detail page be shown for that product. The User can do this by selecting the appropriate link on the Product Locator page, which requests 248 this page from the Manufacturer Site Services 212, which in turn request 250 that the Catalog Service Proxy 214 retrieve 252 the appropriate Part Detail information via the Cloud Catalog Services API 216 with a request 254 to the Cloud Catalog Services. The appropriate Product Detail information may be assembled by logic in the Cloud Catalog Services and returned 256, 258, 260, to Manufacturer Web Site Services 212, which creates the Product Detail page using this returned product-specific information and serves 262 it to the browser for viewing by the User 252. The Product Detail information can include information such as an identity of a catalog in which the product or part appeared, a page number on which that product or part appeared, a year in which that product or part was manufactured, a unique product or part identifier, an identity of the manufacturer of that product or part, a set of local stores (and their street addresses, phone numbers, and/or website URLs) at which the product or part is currently in stock, current real-time prices of the product or part at those stores, current real-time quantities of the product or part in stock at those stores, a list of related products or parts viewed and/or purchased by others who viewed or purchased that product or part, a link to information concerning a new product or part that has obsoleted the selected product or part, attributes of the part, etc. The Product Detail information can also include a three-dimensional computer-aided design (CAD) model of the product or part, with which User 252 can interact by zooming, rotating, or downloading (or directly inserting) a CAD file of the product, in the correct format, into their existing CAD design. Part attributes can include facts about a part such as length, weight, color, maximum pressure, etc. The attributes that a particular part has can vary based on the type of that part. For example, a caster might have attributes such as wheel diameter, tread width, load weight, etc., while a gear might have attributes such as number of grooves, tooth pitch, flange diameter, etc. In an embodiment, the Cloud Catalog Services can be queried for parts that have part attributes that are specified by the User 202. For example, the Cloud Catalog Web Service 218 logic can determine a product set that has the part attributes that are specified by the User 202.

Benefits of Technique

Figure 3:
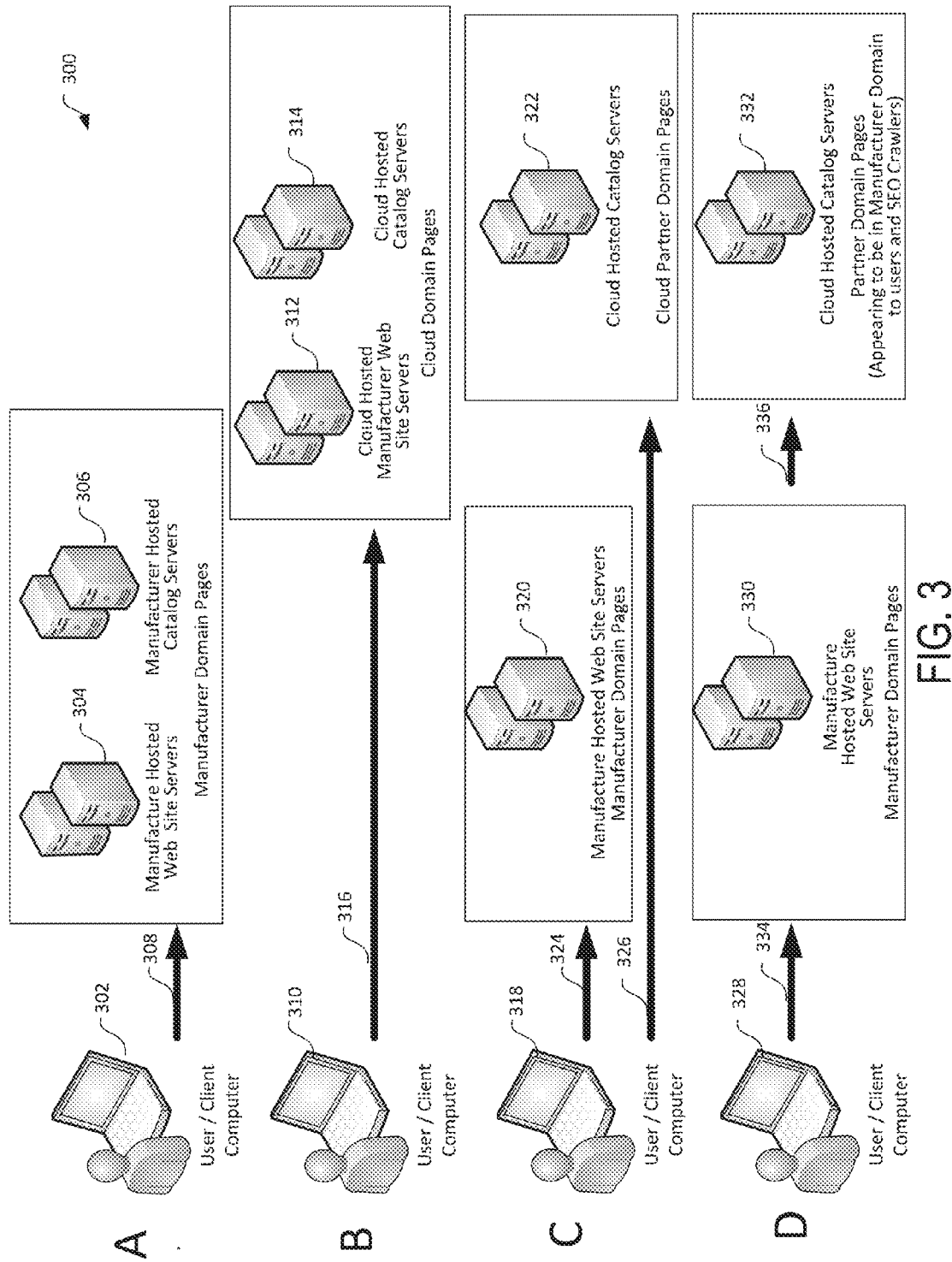
FIG. 3 illustrates examples of a Manufacturer's configuration options for delivering a Corporate Web Site and a Products Catalog using both conventional techniques and the cross-domain communication techniques according to some embodiments.

FIG. 3 illustrates some of the features enabled by this cross-domain technique for product catalog implementation and delivery using four different example configurations for delivery of such a catalog.

In Configuration A, both the Corporate Web Site Servers 304 and the Catalog Servers 306 are maintained by the Manufacturer, and all pages may be served within its home domain 308.

In Configuration B, both systems 312, 314 are hosted in the cloud by a Partner, and again, all pages for the Corporate Site and the Product Catalog may be served from the same domain 316.

In Configuration C, the corporate web site 320 is hosted by the manufacturer and the catalog system 322 is hosted in the cloud by a Partner; and pages from each of these systems may be delivered to the User from different domains 324, 326.

In configuration D, techniques according to some embodiments of the invention are used. In this configuration, the Manufacturer-maintained Servers 320 may both deliver pages 334 and act as an intermediary 336 between the User's Client Computer 318 and the Catalog Servers 322 maintained by a Partner in the cloud.

Configuration A may provide the advantage of offering the manufacturer web site maintenance flexibility and the Search Engine Optimization (SEO) advantage of all catalog pages within the same internet domain owned by the manufacturer. However, Configuration A may have the disadvantage that the manufacturer cannot gain the cost and maintenance efficiency advantages of having the complex catalog system hosted on Partner servers in the cloud.

Configuration B may be considered the reverse of Configuration A. It may have the same SEO advantage as Configuration A, since both web site and catalog are in the manufacturer's domain. However, because that domain is externally hosted by a cloud-based Partner, the solution can be less flexible and cost-effective for the manufacturer.

In Configuration C, the Manufacturer Web Site and Catalog Servers are hosted in different locations and their pages are in different domains. This configuration may allow the manufacturer needed flexibility and control in maintaining their corporate web site, and at the same time may provide the cost efficiencies of an externally hosted catalog solution. However, since the catalog pages are not in the manufacturer's domain, they might not contribute to SEO page rank for the manufacturer.

Configuration D is similar to Configuration C, but with a significant difference. The manufacturer's web site and catalog are hosted at different locations, thereby providing the advantages cited for Configuration C. However, because Configuration D uses cross-domain JSONP-based invocation of catalog services from a Partner, the catalog pages appear to the user and to search engine indexing programs (bots') as being in the manufacturer's domain. This can contribute substantially to the manufacturer's search engine results page rank, thereby conferring a major business advantage.

The configurations depicted in FIG. 3 and described above are not intended to be limiting. Various other configurations are possible in alternative embodiments.

Figure 4:
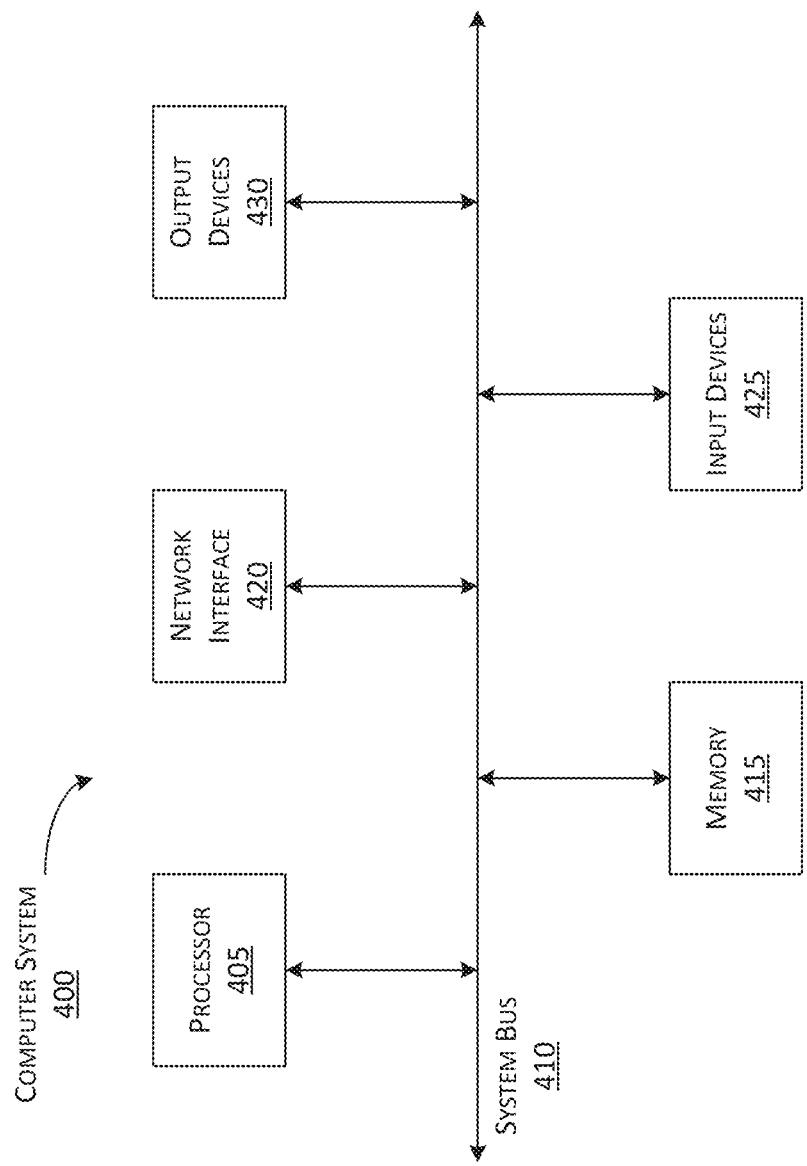
FIG. 4 illustrates an example of a computer system in which various aspects of the disclosure may be implemented.

FIG. 4 illustrates an example of a computer system 400 in which various aspects of the disclosure may be implemented. The various computers and servers illustrated in the previously described figures, such as the client computer 202, the manufacturer web site servers 204, and the cloud catalog servers 206, may implement any and/or all of the components of computer system 400 depicted in FIG. 4. In some arrangements, these computers and servers further may include other components in addition to and/or instead of those seen in computer system 400.

As seen in FIG. 4, the computer system 400 may include a processor 405, which may be interconnected to other components of the computer system 400 via system bus 410. This interconnection may enable processor 405 to execute instructions stored in memory 415, for example, and control other components of the computer system 400, such as network interface 420, one or more input devices 425, and one or more output devices 430. Network interface 420 may facilitate communication with other computer systems, and may include wired network interfaces, such as an Ethernet interface, and/or wireless network interfaces, such as an IEEE 802.11 interface. Input devices 425 may include peripheral devices, such as one or more keyboards, mice, microphones and/or the like, and output devices 430 may include various output subsystems, such as one or more displays, speakers, and/or the like. Other components may be similarly coupled to and/or otherwise implemented in computer system 400.

Although the invention has been described with respect to specific embodiments, it will be appreciated that the invention is intended to cover all modifications and equivalents within the scope of the following claims. Any and/or all of the techniques, methods, and/or method steps discussed above can implemented in software (e.g., programs, code, instructions), hardware, or combinations thereof. The software may be stored on a non-transitory storage medium (e.g., the memory discussed above), and, when executed by one or more processors, may cause a computer system to perform one or more of the techniques, methods, and/or method steps. Additionally or alternatively, in some embodiments, any and/or all of the software may leverage a Software as a Service (SaaS) model, in which one or more methods and/or method steps are executed and/or otherwise performed in the cloud (e.g., at a web server) in order to provide various functionality to a remote end user (e.g., at the user's web browser).

What is claimed is:

1. A computer-implemented method comprising:
receiving, at a first computer system comprising a processor and a memory, from a user's device that is separate from the first computer system, a first request that identifies a particular product, wherein the first computer system is associated with a first Internet domain;
in response to receiving the first request, sending, from the first computer system, to a second computer system that is separate from the first computer system, a second request that identifies the particular product, wherein the second computer system is associated with a second Internet domain that is different from the first Internet domain, and wherein the second computer system comprises a processor and a memory;
receiving, at the first computer system, from the second computer system, detail information that pertains to the particular product and that the second computer system generated in response to the second request;
in response to receiving the detail information, generating, at the first computer system, a product detail web page that includes at least some of the detail information, wherein the product detail web page is associated with the first Internet domain; and
sending the product detail web page from the first computer system to the user's device as a response to the first request.

2. The computer-implemented method of claim 1, further comprising:
prior to receiving the first request, receiving, at the first computer system, from the user's device, through a catalog widget that is contained within an initial product locator web page that is separate from the product detail web page, a third request that specifies product criteria;
in response to receiving the third request, sending, from the first computer system, to the second computer system, a fourth request that specifies the product criteria;
receiving, at the first computer system, from the second computer system, information identifying a set of products that have characteristics that satisfy the product criteria and which set the second computer system generated in response to the fourth request and which set includes an identifier of the particular product;
in response to receiving the information identifying the set of products, generating, at the first computer system, through the catalog widget, a revised product locator web page that includes at least some of the information identifying the set of products; and
sending the revised product locator web page from the first computer system to the user's device as a response to the third request.

3. The computer-implemented method of claim 2, further comprising:
prior to receiving the third request, receiving a fifth request at the first computer system from the user's device;
in response to receiving the fifth request, sending, from the first computer system, to the second computer system, a sixth request for the initial product locator web page that is separate from the revised product locator web page;
receiving, as a response to the sixth request, at the first computer system, from the second computer system, product locator information including the catalog widget;
in response to receiving the product locator information, generating the initial product locator web page at the first computer system at least in part by embedding the catalog widget into the initial product locator web page; and
sending the initial product locator web page from the first computer system to the user's device as a response to the fifth request.

4. The computer-implemented method of claim 3, wherein sending the sixth request comprises:
sending a seventh request from the first computer system to a catalog service proxy; and
sending a JavaScript Object Notation with Padding (JSONP) request from the catalog service proxy to the second computer system through a cloud catalog web services application programming interface (API) of the second computer system.

5. The computer-implemented method of claim 4, wherein receiving the product locator information including the catalog widget comprises receiving the product locator information at the catalog service proxy as a response to the JSONP request.

6. The computer-implemented method of claim 3, wherein sending the sixth request comprises:

sending a seventh request from the first computer system to a catalog service proxy located at a site with the first computer system; and sending a JavaScript Object Notation with Padding (JSONP) request from the catalog service proxy to the second computer system over the Internet in response to the seventh request.

7. The computer-implemented method of claim 3, wherein sending the sixth request comprises sending a cross-domain request over the Internet from the first Internet domain to the second Internet domain; and wherein the uniform resource locator (URL) of the initial product locator web page specifies the first Internet domain rather than the second Internet domain.

8. The computer-implemented method of claim 2, wherein sending the fourth request comprises:

sending, from the first computer system to a catalog service proxy, a seventh request that specifies the product criteria, which a user of the user's device inputted into the catalog widget while the catalog widget was being executed within a browser application resident on the user's device; and sending, in response to the seventh request, from the catalog service proxy to the second computer system through a cloud catalog web services application programming interface (API) of the second computer system, a JavaScript Object Notation with Padding (JSONP) request that specifies the product criteria.

9. The computer-implemented method of claim 8, wherein receiving the information identifying the set of products comprises receiving the information identifying the set of products at the catalog service proxy as a response to the JSONP request.

10. The computer-implemented method of claim 6, wherein sending the fourth request comprises:

sending, from the first computer system to a catalog service proxy located at a site with the first computer system, a seventh request that specifies the product criteria; and in response to the seventh request, sending, from the catalog service proxy to the second computer system over the Internet, a JavaScript Object Notation with Padding (JSONP) request that specifies the product criteria.

11. The computer-implemented method of claim 2, wherein sending the fourth request comprises sending, over the Internet from the first Internet domain to the second Internet domain, a cross-domain request that specifies the product criteria; and wherein the uniform resource locator (URL) of the revised product locator web page specifies the first Internet domain rather than the second Internet domain.

12. The computer-implemented method of claim 1, wherein sending the second request comprises:

sending, from the first computer system to a catalog service proxy, a seventh request that identifies the particular product, which a user of the user's device selected from a set of products presented to the user as a consequence of JavaScript instructions executing within a browser application resident on the user's device; and sending, in response to the seventh request, from the catalog service proxy to the second computer system through a cloud catalog web services application programming interface (API) of the second computer system, a JavaScript Object Notation with Padding (JSONP) request that identifies the particular product.

13. The computer-implemented method of claim 12, wherein receiving the detail information comprises receiving the detail information at the catalog service proxy as a response to the JSONP request.

14. The computer-implemented method of claim 1, wherein sending the second request comprises:

sending, from the first computer system to a catalog service proxy located at a site with the first computer system, a seventh request that identifies the particular product; and in response to the seventh request, sending, from the catalog service proxy to the second computer system over the Internet, a JavaScript Object Notation with Padding (JSONP) request that identifies the particular product.

15. The computer-implemented method of claim 1, wherein sending the second request comprises sending, over the Internet from the first Internet domain to the second Internet domain, a cross-domain request that identifies the particular product; and wherein the uniform resource locator (URL) of the revised product locator web page specifies the first Internet domain rather than the second Internet domain.

16. The computer-implemented method of claim 1, further comprising:

retrieving, from the second computer system, a particular web page containing JavaScript instructions which, when executed by the user's device, provide an interface through which a set of product identifiers is displayable, and from which product identifiers are selectable; and forwarding the particular web page to the user's device; wherein the JavaScript instructions, when executed by the user's device, cause a different web page, specifying an Internet domain of the first computer system within the uniform resource locator of that different web page, to be obtained each time that a different product identifier is selected through the interface, thereby making each said different web page appear, to a search engine's web crawling mechanism, to be associated with the Internet domain of the first computer system rather than an Internet domain of the second computer system.

17. The computer-implemented method of claim 16, wherein the JavaScript instructions, when executed by the user's device, provide an interface through which a type of part is specifiable; and wherein the JavaScript instructions, when executed by the user's device, send a specified type of part to the second computer system in response to user specification of the specified type of part through the interface; and wherein the JavaScript instructions, when executed by the user's device, present a set of identifiers of parts having the specified type in response to receiving the set of identifiers of parts from the second computer system.

18. The computer-implemented method of claim 16, wherein the JavaScript instructions, when executed by the user's device, present, for each particular part identifier in the set of identifiers: a current price of the part identified by that particular part identifier, and a current quantity in stock of the part identified by that particular part identifier.

19. A computer system associated with a first Internet domain, the computer system comprising:

a processor; and a memory storing instructions executable by the processor, the instructions comprising instructions that cause the processor to:

receive, from a user's device that is separate from the computer system, a first request that identifies a particular product;

in response to receiving the first request, send, to a content provider system that is separate from the computer system, a second request that identifies the particular product, wherein the content provider system is associated with a second Internet domain that is different from the first Internet domain;

receive, from the content provider system, detail information that pertains to the particular product and that the content provider system generated in response to the second request;

in response to receiving the detail information, generate, a product detail web page that includes at least some of the detail information, wherein the product detail web page is associated with the first Internet domain; and send the product detail web page to the user's device as a response to the first request.

\* \* \* \* \*